(12) United States Patent
Suzuki (10) Patent No.: US 10,146,490 B2
(45) Date of Patent: Dec. 4, 2018

(54) PRINTING APPARATUS

(71) Applicant: KYOCERA Document Solutions Inc., Osaka-shi, Osaka (JP)

(72) Inventor: Atsushi Suzuki, Osaka (JP)

(73) Assignee: KYOCERA DOCUMENT SOLUTIONS INC., Osaka-Shi, Osaka (JP)

( * ) Notice: Subject to any disclaimer, the term of this patent is extended or adjusted under 35 U.S.C. 154(b) by 0 days.

(21) Appl. No.: 15/690,315

(22) Filed: Aug. 30, 2017

(65) Prior Publication Data

US 2018/0060001 A1 Mar. 1, 2018

(30) Foreign Application Priority Data

Aug. 31, 2016 (JP) .................................. 2016-169425

(51) Int. Cl.
*G06F 3/12* (2006.01)
*H04N 1/23* (2006.01)

(52) U.S. Cl.
CPC .......... *G06F 3/1242* (2013.01); *G06F 3/1204* (2013.01); *G06F 3/1208* (2013.01); *G06F 3/1256* (2013.01); *G06F 3/1258* (2013.01); *G06F 3/1273* (2013.01); *G06F 3/1285* (2013.01); *H04N 1/23* (2013.01); *H04N 2201/0029* (2013.01)

(58) Field of Classification Search
CPC .... G06F 3/1242; G06F 3/1204; G06F 3/1258; G06F 3/1273; H04N 2201/0029
See application file for complete search history.

(56) References Cited

U.S. PATENT DOCUMENTS

| 2006/0218496 A1* | 9/2006 | Kunori | G06F 3/1204 715/210 |
| 2009/0097064 A1* | 4/2009 | Tominaga | H04N 1/00917 358/1.15 |
| 2015/0269464 A1* | 9/2015 | Atsumi | G06K 15/4095 358/1.16 |

FOREIGN PATENT DOCUMENTS

| JP | 2002-292942 A | 10/2002 |
| JP | 2007-043375 A | 2/2007 |
| JP | 2003-330658 A | 11/2013 |

* cited by examiner

*Primary Examiner* — Moustapha Diaby
(74) *Attorney, Agent, or Firm* — Viering, Jentschura & Partner mbB (57) ABSTRACT

The printing apparatus can perform differential printing to print differences between a print-target image data set and a reference-source image data set, and includes a differential print request accepting unit, a differential extraction unit, a differential thumbnail image creating unit, and an output control unit. If the differential print request accepting unit accepts a differential print request, the differential extraction unit compares the print-target image data set with the reference-source image data set and extracts a difference between them. The differential thumbnail image creating unit places a mark on an area containing the difference, which is extracted by the differential extraction unit, in a page of the print-target image data set, and creates a differential thumbnail image which is a thumbnail image of the page containing the difference. The output control unit performs control operations to output the differential thumbnail image created by the differential thumbnail image creating unit.

6 Claims, 7 Drawing Sheets

PRINTING APPARATUS

CROSS REFERENCE TO RELATED APPLICATIONS

This application claims priority to Japanese Patent Application No. 2016-169425, which was filed on Aug. 31, 2016, and is incorporated herein by reference in its entirety.

BACKGROUND

This disclosure relates to a printing apparatus.

Printing apparatuses, typified by multifunction peripherals, acquire image data from a computer connected thereto via a network. In response to a print request received with the image data from the computer, the printing apparatuses form an image on paper for printing, and output the paper out of the printing apparatuses.

Conventionally known technologies for printing an updated original document (or document) include replacement printing that prints only pages having been corrected or changed and replaces with the printed pages, and differential printing.

In a conventional printing system, a host computer creates data with application software running thereon and transmits the data to a printer, and the printer prints out the data. The conventional printing system is characterized in that the host computer includes: means for, when a user executes printing operation, specifying whether differential printing is executed; means for, if differential printing is performed, expanding the printed data and saving PDL object data (referred to as Data A) generated by a printer drive for the next differential printing; means for searching for PDL object data (referred to as Data B) saved at the last differential printing; means for comparing whole data between Data A and Data B first page on a per-page basis; means for, if the comparing means has determined that a page of Data A is totally identical to the corresponding page of Data B, determining not to print the page; means for, if the comparing means has determined that a page of Data A has at least a different portion from the corresponding page of Data B, determining to print the page; and means for printing the page that has been determined by the determining means to be printed.

A typical image forming apparatus system is composed of a computer terminal connected to a network and an image forming apparatus. The computer terminal includes print data conversion means and transmission means. The image forming apparatus includes receiving means, expansion means, storage means, operation instructing means, and printing means. The image forming apparatus also includes placement means, transporting means, inserting means, and a sheet processing device. The image forming apparatus system includes means for instructing whether to perform replacement printing before the computer terminal stores a document in the image forming apparatus, and is characterized in that the image forming apparatus includes to perform replacement printing: ejecting means for ejecting a sheet printed by the printing means to first storage means when a page is inserted; ejecting means for ejecting a sheet placed to second storage means when a page is deleted; ejecting means for ejecting a sheet placed to the second storage means or for ejecting a sheet printed by the printing means to the first storage means when a page is replaced; and ejecting means for ejecting a sheet placed to the first storage means for the other pages, or includes the combination of the aforementioned means.

A typical printing system includes an editing device that creates and edits book data composed of a plurality of page data pieces, a print control device that transmits print data obtained by rasterizing the book data to a printing machine, and the printing machine that performs printing operation based on the print data. The print control device includes means for specifying a page needing correction from page data stored in the book data, means for transmitting the specified page needing correction and information used to specify the page needing correction to the editing device, means for rasterizing the page edited by the editing device, and means for replacing the page needing correction stored in the print data with the rasterized corrected page data. The editing device includes means for editing the specified page needing correction.

SUMMARY

The printing apparatus according to the present disclosure is capable of performing differential printing that enables printing of differences between print-target image data set to be printed and reference-source image data set to be compared during differential printing. The printing apparatus includes a storage unit storing image data, a printing unit performing printing operations based on the image data, a differential print request accepting unit, a differential extraction unit, a differential thumbnail image creating unit, and an output control unit. The differential print request accepting unit accepts differential print requests. If the differential print request accepting unit accepts a differential print request, the differential extraction unit compares the print-target image data set with the reference-source image data set and extracts the difference between them. The differential thumbnail image creating unit places a mark on an area containing the difference, which is extracted by the differential extraction unit, in a page of the print-target image data set, and creates a differential thumbnail image which is a thumbnail image of the page containing the difference. The output control unit performs control operations to output the differential thumbnail image created by the differential thumbnail image creating unit.

DETAILED DESCRIPTION

Figure 1:
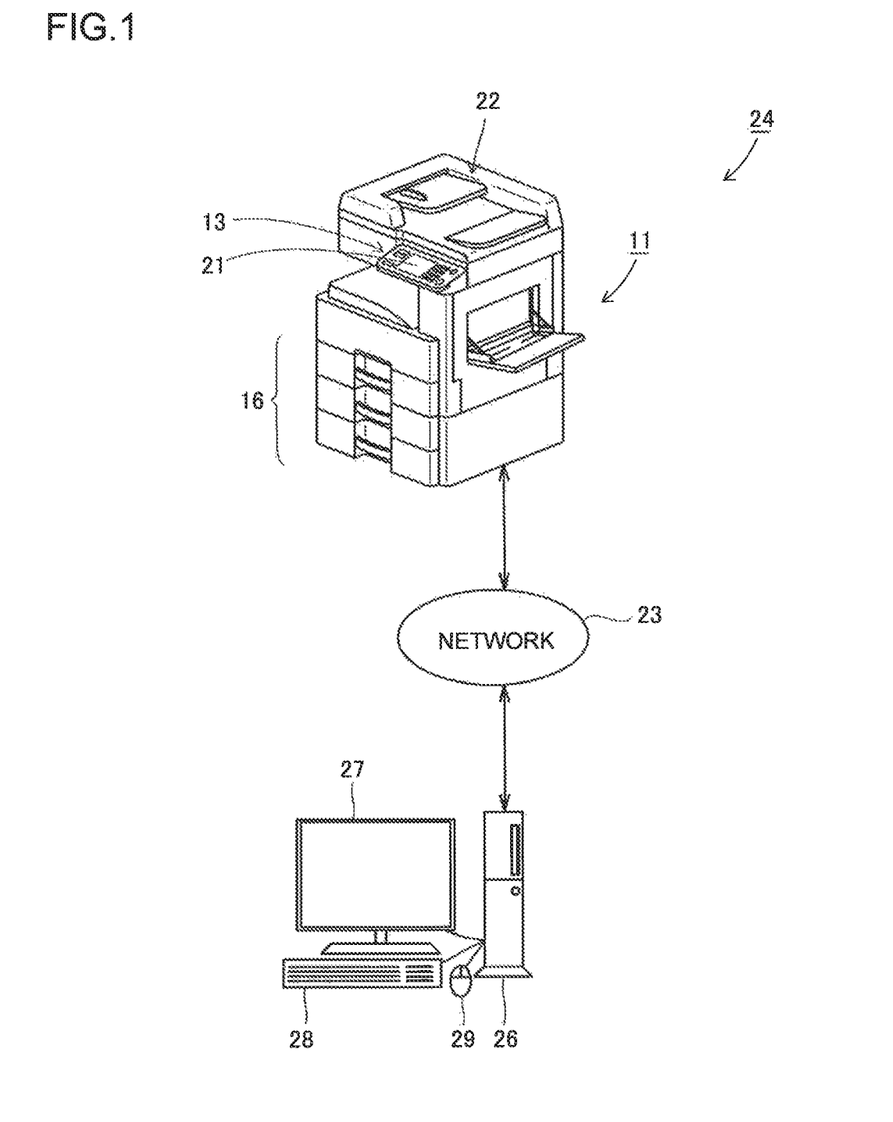
FIG. 1 is a schematic external view of a printing system including a multifunction peripheral to which a printing apparatus according to an embodiment of the present disclosure is applied.
Figure 2:
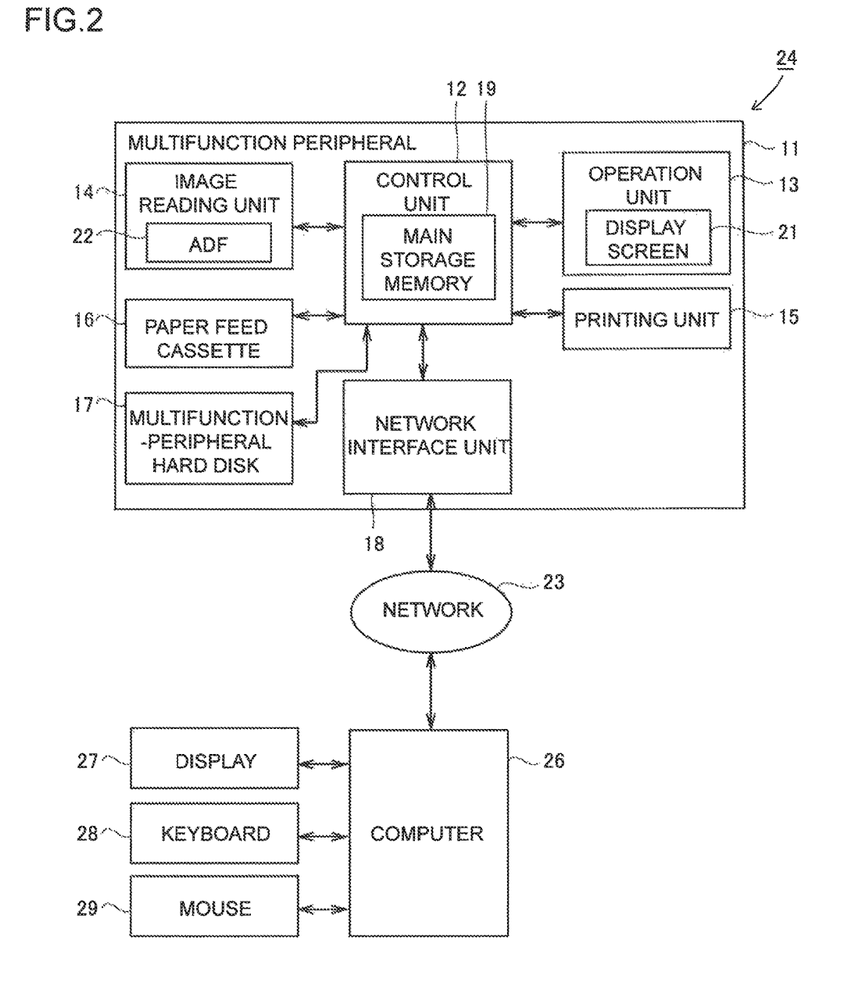
FIG. 2 is a block diagram showing the configuration of the printing system shown in FIG. 1.

An embodiment of the present disclosure will be described below. FIG. 1 is a schematic external view of a printing system 24 including a multifunction peripheral 11 to which the printing apparatus according to the embodiment of the present disclosure is applied. FIG. 2 is a block diagram showing the configuration of the printing system 24 shown in FIG. 1.

Referring to FIGS. 1 and 2, the printing system 24 includes the multifunction peripheral 11 and a computer 26 which is an external device connectable to the multifunction peripheral 11 via a network 23. The computer 26 can make a print request to the multifunction peripheral 11 via the network 23. The multifunction peripheral 11 can perform differential printing to print differences between a print-target image data set to be printed and a reference-source image data set to be compared during differential printing.

Firstly, the configuration of the computer 26 will be described. A display 27, a keyboard 28, and a mouse 29 are connected to the computer 26. The display 27 displays information and data from the computer 26. The user inputs data to the computer 26 using the keyboard 28 and mouse 29 while checking the screen displayed on the display 27.

Secondly, the configuration of the multifunction peripheral 11 will be described. The multifunction peripheral 11 has a plurality of functions relating to image processing, such as a copying function, a printer function, and a facsimile function. The multifunction peripheral 11 includes a control unit 12, an operation unit 13, an image reading unit 14, a printing unit 15, paper feed cassettes 16, a multifunction-peripheral hard disk 17, and a network interface unit 18 used to connect with the network 23. In other words, the multifunction peripheral 11 is configured to include the network interface unit 18 serving as an external-device connector that connects the multifunction peripheral 11 to the computer 26 which is an external device.

The control unit 12 controls the entire multifunction peripheral 11, and includes a main storage memory 19 that temporarily stores data. The operation unit 13 includes a touch panel type display screen 21 that serves as a display unit displaying information submitted from the multifunction peripheral 11 and entries made by users. The operation unit 13 accepts input of information relating to image formation, such as image forming conditions including the number of prints and gradation degrees, from users. The image reading unit 14 includes an auto document feeder (ADF) 22 serving as a document transporting device that transports an original document placed on a loading position to a reading position. The image reading unit 14 reads images of the original document loaded in the ADF 22 or placed on a document table (not shown). Each of the paper feed cassettes 16 can hold a plurality of sheets of paper. The printing unit 15 forms an image on paper transported from the paper feed cassettes 16 or other paper feeders, based on image data of the original document read by the image reading unit 14 or image data transmitted via the network 23. The multifunction-peripheral hard disk 17 serving as a storage unit for storing image data stores data relating to image formation, such as transmitted image data and input image forming conditions.

Figure 3:
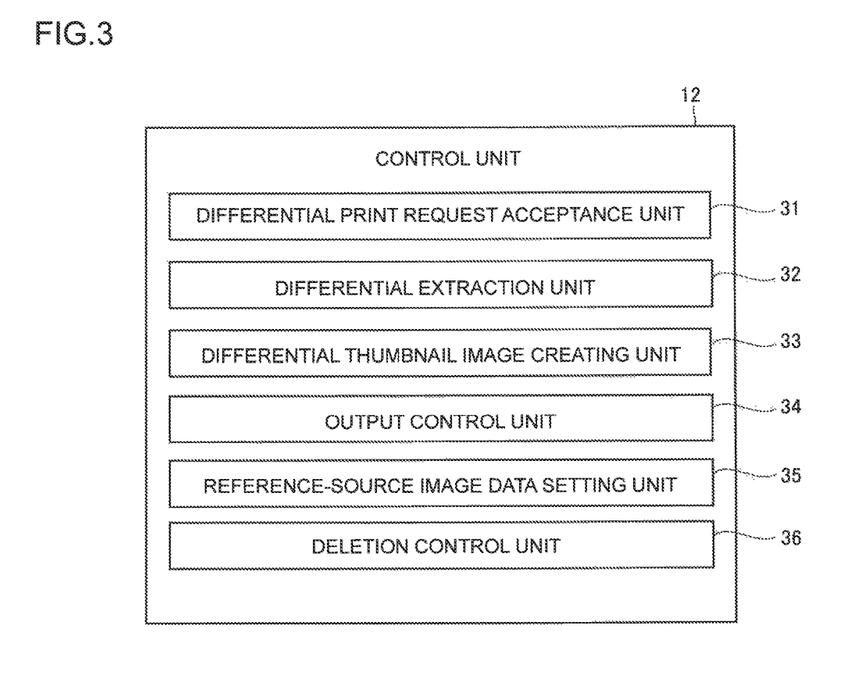
FIG. 3 is a block diagram showing the configuration of a control unit.

Next, the configuration of the control unit 12 will be described. FIG. 3 is a block diagram showing the configuration of the control unit 12. Referring to FIG. 3, the control unit 12 includes a differential print request accepting unit 31, a differential extraction unit 32, a differential thumbnail image creating unit 33, an output control unit 34, a reference-source image data setting unit 35, and a deletion control unit 36. The differential print request accepting unit 31 accepts differential print requests. If the differential print request accepting unit 31 accepts a differential print request, the differential extraction unit 32 compares a print-target image data set with a reference-source image data set and extracts the differences therebetween. The differential thumbnail image creating unit 33 places a mark on areas containing the differences, which are extracted by the differential extraction unit 32, in pages of the print-target image data set, and creates differential thumbnail images which are thumbnail images of the pages containing the differences. The output control unit 34 performs control operations to output the differential thumbnail images created by the differential thumbnail image creating unit 33. Specifically, the output control unit 34 controls the printing unit 15 to print the differential thumbnail images. The reference-source image data setting unit 35 allows a user to select the printing apparatus or the user to retrieve the reference-source image data set. The deletion control unit 36 performs control operations to delete the reference-source image data set stored in the multifunction-peripheral hard disk 17 from the multifunction-peripheral hard disk 17 after the lapse of a predetermined period.

Figure 4:
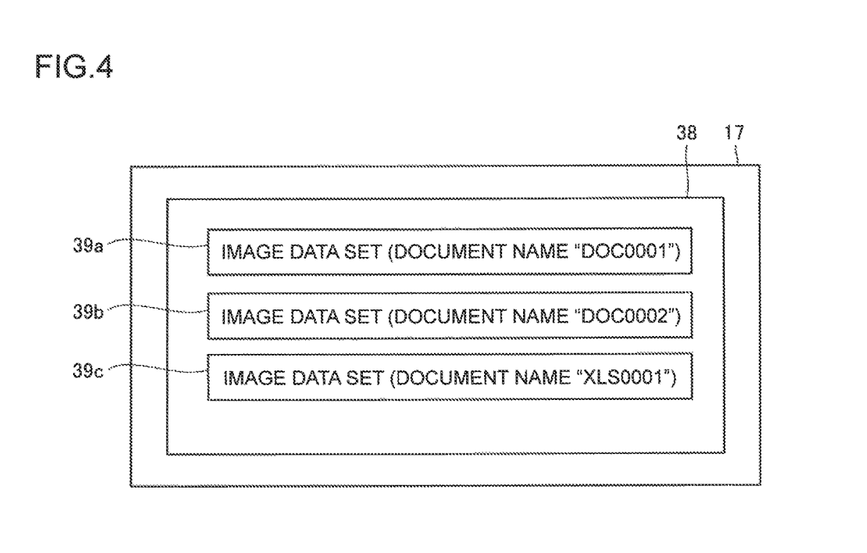
FIG. 4 is a conceptual diagram showing a storage area of a multifunction-peripheral hard disk.

A description will be made about image data sets stored in the multifunction-peripheral hard disk 17. FIG. 4 is a conceptual diagram showing a storage area of the multifunction-peripheral hard disk 17. Referring to FIG. 4, the storage area 38 of the multifunction-peripheral hard disk 17 holds a plurality of image data sets that have been printed in the past by the multifunction peripheral 11. In this example, there are three image data sets 39a, 39b, and 39c in the storage area 38. Each of the image data sets 39a to 39c is stored in association with a document name. Concretely, the image data set 39a is stored in association with a document name "DOC0001", the image data set 39b is stored in association with a document name "DOC0002", and the image data set 39c is stored in association with a document name "XLS0001". These image data sets 39a to 39c are image data sets that were printed by the multifunction peripheral 11 in the past, more specifically, within a predetermined period before this point in time, and remain stored in the storage area 38 of the multifunction-peripheral hard disk 17.

Figure 5:
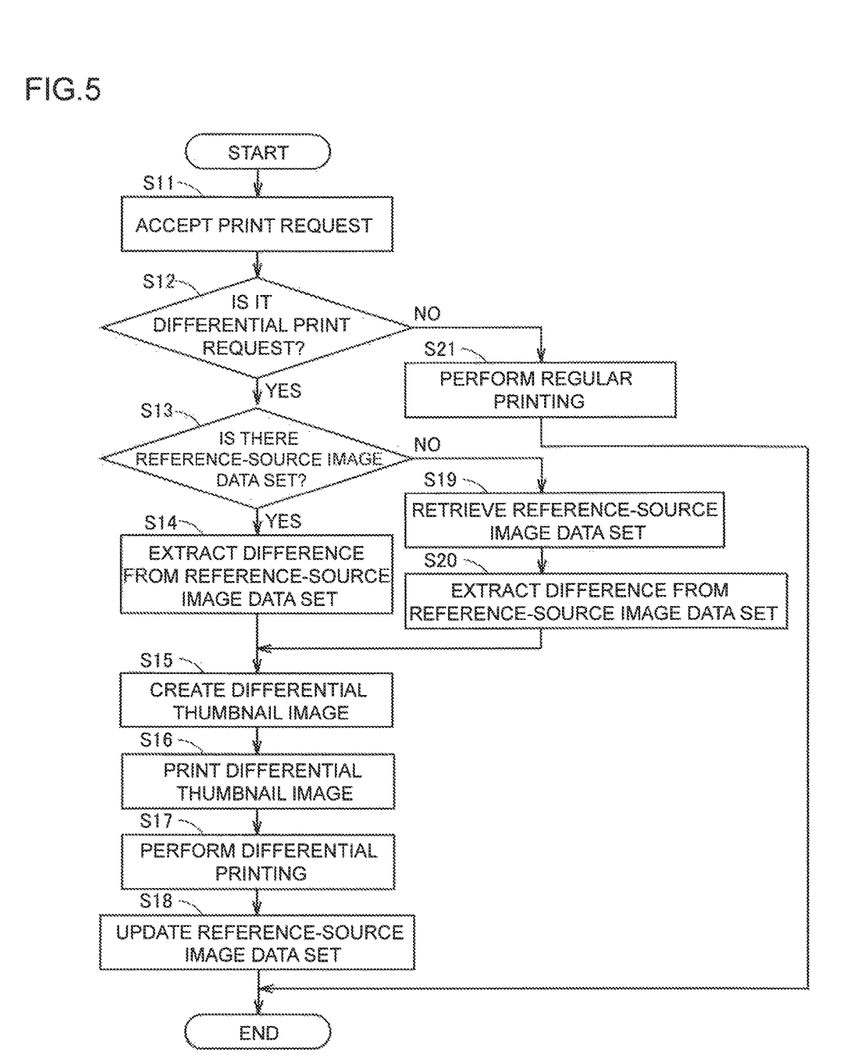
FIG. 5 is a flowchart illustrating a differential printing process performed by a user using the multifunction peripheral.

A description will be now made about differential printing performed by a user using the multifunction peripheral 11. FIG. 5 is a flowchart illustrating a differential printing process performed by the user using the multifunction peripheral 11. In this process, the user performs differential printing on the image data set of the document name "DOC0001". Several changes and corrections have been made and a new page, which is Page 22, has been inserted to the image data set immediately before the image data set is printed.

Referring to FIG. 5, the user goes to a place where a computer 26 is installed. The computer 26 is connected to the multifunction peripheral 11 through a network 23. The user transmits the print-target image data set "DOC0001" to the multifunction peripheral 11 and makes a differential print request by using the computer 26. Then, the multifunction peripheral 11 firstly accepts the print request (step S11 in FIG. 5, hereinafter "step" is omitted).

Figure 6:
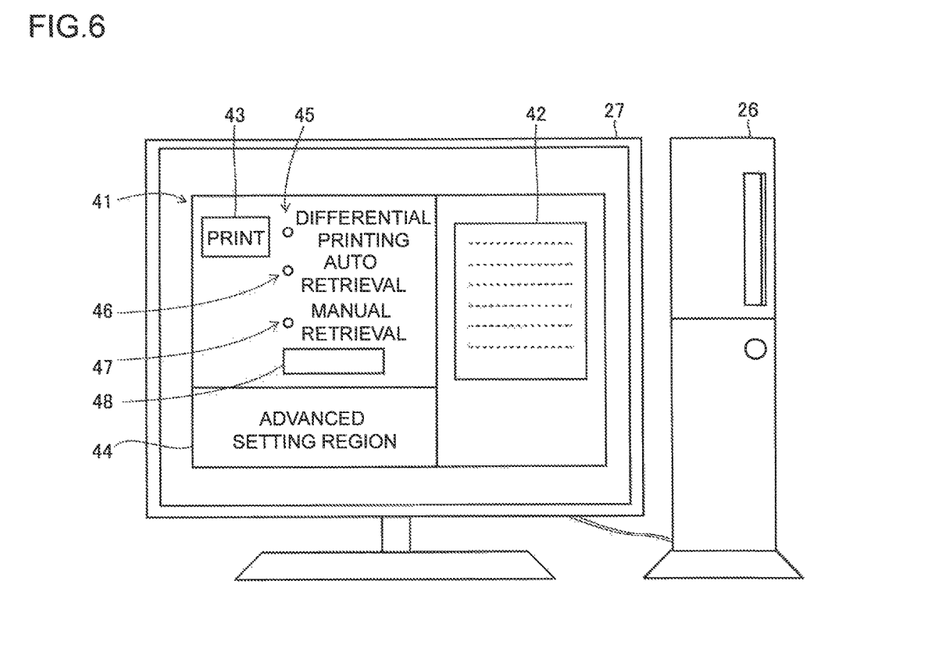
FIG. 6 shows an example screen on a display of a computer to make a differential print request.

FIG. 6 shows an example screen displayed on a display 27 of the computer 26 to make the differential print request. Referring to FIG. 6, the display 27 shows a display screen 41 thereon as a print wizard. On the display screen 41 displayed are print-target image data set, more specifically, image data 42 of a document to be printed, an icon 43 that is labeled "Print" and when clicked, transmits a print request to the multifunction peripheral 11, an advanced setting region 44 used to make advanced print settings, a checkbox 45 allowing the user to select differential printing by checking, a checkbox 46 allowing the user to select automatic retrieval of a reference-source image data set to perform differential printing by checking, in other words, to cause the multifunction peripheral 11 to select a reference-source image data set, a checkbox 47 allowing the user to select manual retrieval of a reference-source image data set to perform differential printing by checking, and a reference-source image data set input field 48 in which the document name of a reference-source image data set is manually input. In short, the checkboxes 46, 47 and reference-source image data set input field 48 serve as a reference-source image data setting unit 35 that allows the user to select the user or multifunction peripheral 11 to retrieve a reference-source image data set. Note that the image data 42 displayed is the first page of the document.

The user checks the checkbox 45 and checkbox 46, and clicks the icon 43. In response to the user's action, the multifunction peripheral 11 automatically retrieves the reference-source image data set and performs differential printing.

If the print request is determined to be a differential print request (YES in S12), the multifunction peripheral 11 checks the presence of the reference-source image data set. Specifically, it is determined whether there is an image data set having the same document name as the received image data set in the storage area 38 of the multifunction-peripheral hard disk 17 (S13).

In this example, since there is the image data set 39a having the same document name in the storage area 38, the multifunction peripheral 11 determines the presence of the reference-source image data set (YES in S13). The differential extraction unit 32 extracts differences between the reference-source image data set 39a and the received image data set, that is, a print-target image data set.

Then, the differential thumbnail image creating unit 33 places a mark on areas containing the differences, which are extracted by the differential extraction unit 32, in pages of the print-target image data set, and creates differential thumbnail images which are thumbnail images of the pages containing the differences (S15). Specifically, the differential thumbnail image creating unit 33 creates the differential thumbnail images such that the marks placed over the areas containing the differences are colored differently from the color of the other areas.

Next, the output control unit 34 performs control operations to output the differential thumbnail images created by the differential thumbnail image creating unit 33. To this end, the output control unit 34 controls the printing unit 15 to print the differential thumbnail images (S16).

Figure 7:
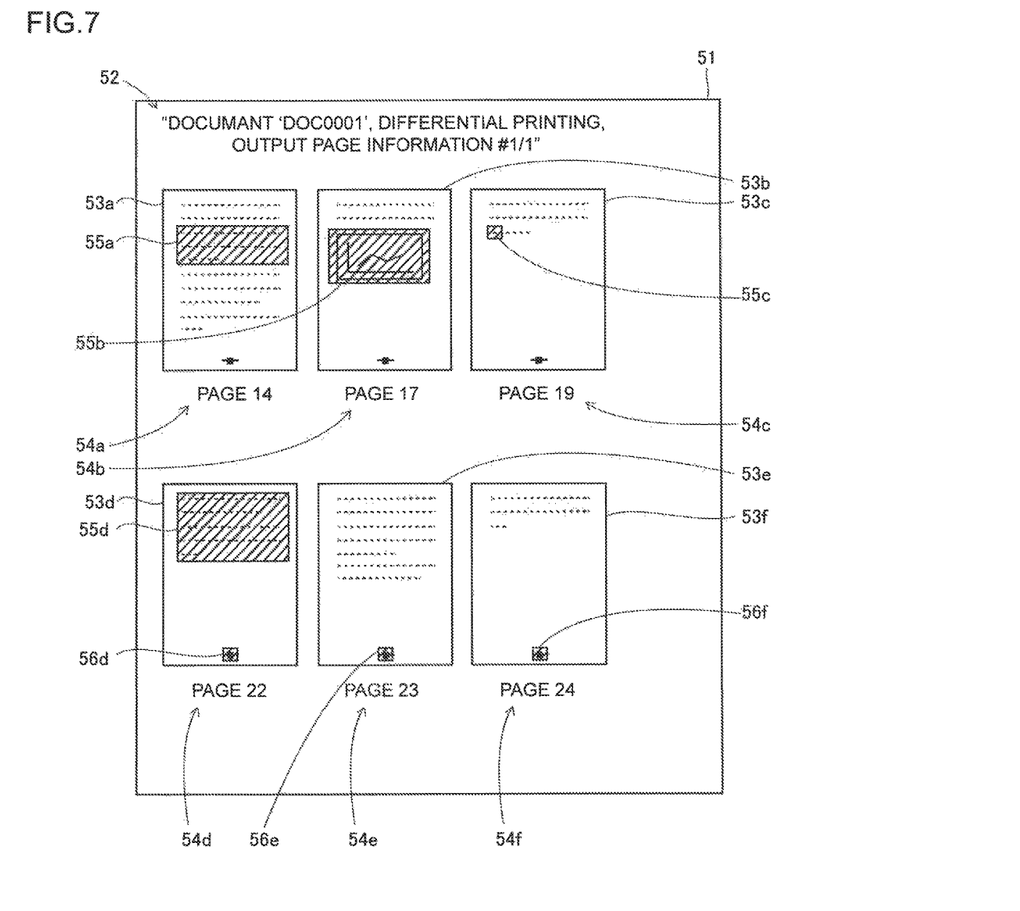
FIG. 7 shows example printed matter on which differential thumbnail images are printed.

FIG. 7 shows example printed matter on which the differential thumbnail images are printed. Referring to FIG. 7, the printed matter 51 includes a description 52 "Document 'DOC0001', Differential printing, Output page information #1/1" to indicate the contents of the printed matter 51, and six differential thumbnail images 53a, 53b, 53c, 53d, 53e, 53f. The differential thumbnail images 53a to 53f are arranged in parallel in orderly sequence. Under the differential thumbnail images 53a to 53f, page numbers 54a, 54b, 54c, 54d, 54e, 54f are printed respectively, which are page numbers of corrected pages in the image data set named as "DOC0001". The page number 54a indicates page 14, the page number 54b indicates page 17, the page number 54c indicates page 19, the page number 54d indicates page 22, the page number 54e indicates page 23, and the page number 54f indicates page 24.

The areas containing the differences are indicated by marks 55a, 55b, 55c, 55d, 56d, 56e, 56f. The marks 56d to 56f are added because there are differences in page number. Specifically, insertion of the differential thumbnail image 53d, which corresponds to page 22, has made changes to only the page numbers of the differential thumbnail images 53e, 53f. The color of the marks 55a to 55d, 56d to 56f added to the areas containing the differences by the differential thumbnail image creating unit 33 is made different from the color of the other areas. Although FIG. 7 represents the marks 55a to 55d, 56d to 56f as a hatch pattern, the marks 55a to 55d, 56d to 56f may be, for example, yellow in contrast to the black and white print-target image data.

The user can visually recognize the areas containing the differences when looking at the printed matter 51. After checking the contents, the user issues a request to perform differential printing. In response to the request, the multifunction peripheral 11 performs differential printing (S17). Specifically, pages 14, 17, 19, 22, 23, and 24, which are six pages in total, are printed. It is also possible to select pages to be printed after checking the contents, and perform differential printing. This can give the user the option of not printing pages 23 and 24 whose page numbers have been incremented due to insertion of page 22, in other words, that are pages having marks only on their page numbers, from the viewpoint of paper resource usage.

Subsequently, the reference-source image data set is updated (S18). This means that the reference-source image data set 39a stored in the storage area 38 is replaced with a new one.

The multifunction peripheral 11 places the marks 55a to 55d and 56d to 56f on the extracted areas containing the differences, creates the differential thumbnail images 53a to 53f, which are thumbnail images of the pages containing the differences, and prints the images. The marks 55a to 55d and 56d to 56f allow the user to easily recognize the areas containing the differences. In other words, the user can find where the areas containing the differences are in the pages to be printed at a glance, and can easily recognize what has been changed, for example, whether only the page numbers have been changed as a result of insertion of a page. This, therefore, can increase user convenience to efficiently perform differential printing.

Since the output control unit 34 controls the printing unit 15 to print the differential thumbnail images 53a to 53f, the user can easily recognize the areas containing the differences with the printed matter 51.

If the user selects manual retrieval on the display screen 41 shown in FIG. 6, or if, in S13, no reference-source image data set is found in the storage area 38 of the multifunction-peripheral hard disk 17 (NO in S13), retrieval operation for a reference-source image data set is performed (S19). In this case, the reference-source image data set is retrieved by inputting, for example, an address other than the multifunction-peripheral hard disk 17 or a file name in the reference-source image data set input field 48.

Then, the differential extraction unit 32 extracts differences between the retrieved reference-source image data set and the print-target image data set (S20). In S15, the differential thumbnail image creating unit 33 creates differential thumbnail images. Subsequent steps are the same as described above.

In S12, if the accepted print request is not a differential print request (NO in S12), the multifunction peripheral 11 performs regular printing (S21), and completes the process.

The deletion control unit 36 performs control operations to delete the image data sets 39a to 39c stored in the storage area 38 of the multifunction-peripheral hard disk 17 from the multifunction-peripheral hard disk 17 after the lapse of a predetermined time. Therefore, the resource of the storage area 38 of the multifunction-peripheral hard disk 17 can be effectively utilized.

Also, in the above-described embodiment, the output control unit 34 can be configured to transmit the differential thumbnail images 53a to 53f to an external device, more specifically, to the computer 26 without printing the differential thumbnail images 53a to 53f.

Figure 8:
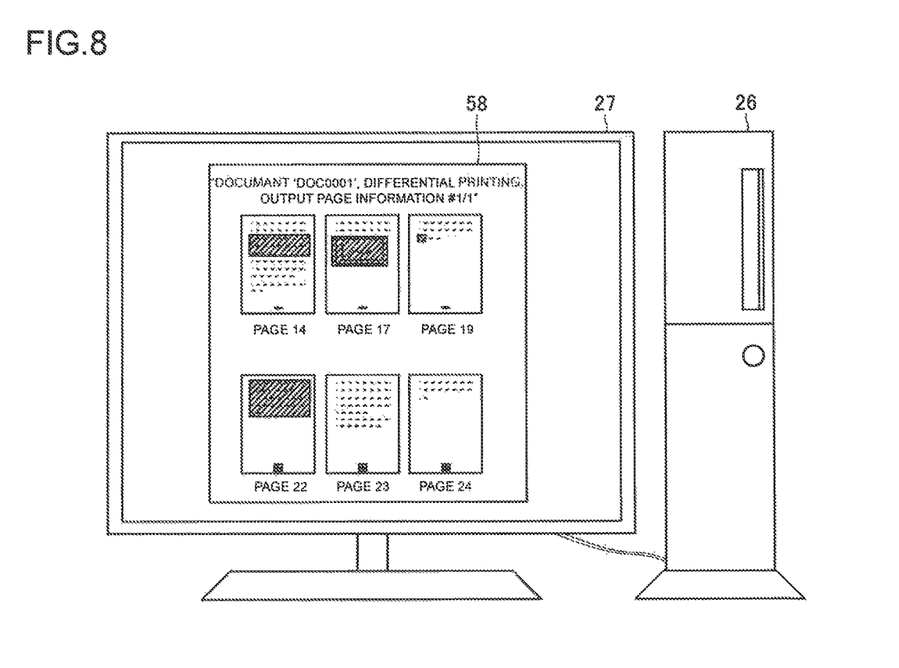
FIG. 8 shows an example screen on the display of the computer.

FIG. 8 shows an example screen on the display 27 of the computer 26. Referring to FIG. 8, the display 27 shows an email-attached file 58 including six differential thumbnail images transmitted from the multifunction peripheral 11 by email. The contents of the displayed file 58 are the same as the differential thumbnail images 53a to 53f in the printed matter 51 shown in FIG. 7. The user can print the required pages, more specifically, all the pages displayed as thumbnails or only the pages selected from the thumbnails.

This configuration can ensure reliable transmission of differential thumbnail images to a user-owned external device and can reduce the output of the printed matter 51, thereby saving paper resources.

Although the marks placed on the areas containing the differences are colored differently from the other areas in the above-described embodiment, the present disclosure is not limited thereto, and, for example, the marks may be lines of a different color drawn so as to enclose the areas containing the extracted differences. Alternatively, the marks can be placed by filling the areas containing the extracted differences with a color different from the other areas.

In addition, the differential thumbnail images are transmitted by email in the above-described embodiment; however, the present invention is not limited thereto, and the differential thumbnail images can be transmitted by near field communication (NFC), infrared communication, and other communication methods.

It should be understood that the embodiment disclosed herein is illustrative and non-restrictive in every respect. The scope of the present disclosure is defined by the terms of the claims, rather than by the foregoing description, and is intended to include any modifications within the scope and meaning equivalent to the terms of the claims.

The printing apparatus according to the present disclosure can be effectively used especially to meet a demand for improved user convenience to perform differential printing efficiently.

What is claimed is:

1. A printing apparatus capable of performing differential printing to print differences between a print-target image data set to be printed and a reference-source image data set to be compared during differential printing, comprising:
a storage unit that stores image data sets;
a printing unit that performs printing based on the image data sets; and
a controller configured to control the printing apparatus, wherein the controller is further configured to:
accept differential print requests;
compare the print-target image data set with the reference-source image data set, and extract a difference between them, when a differential print request is accepted;
place a mark on an area containing the difference, after extraction, in a page of the print-target image data set, and create a differential thumbnail image, which is a thumbnail image of the page containing the difference;
perform control operations to output the differential thumbnail image; and
when there is only a difference in page number for the differential thumbnail images, the mark is placed on the page number and creates the differential thumbnail image.

2. The printing apparatus according to claim 1, wherein the controller is further configured to control the printing unit to print the differential thumbnail image.

3. The printing apparatus according to claim 1 further comprising
an external-device connector that connects an external device and the printing apparatus, wherein
the controller is further configured to perform control operations to transmit the differential thumbnail image to the external device through the external-device connector.

4. The printing apparatus according to claim 1, wherein the controller is further configured to create the differential thumbnail image such that the mark placed on the area containing the difference is colored differently from the other areas.

5. The printing apparatus according to claim 1, wherein the controller is further configured to allow a user to select the printing apparatus or the user to retrieve the reference-source image data set.

6. The printing apparatus according to claim 1, wherein the controller is further configured to perform control operations to delete the reference-source image data set stored in the storage unit from the storage unit after the lapse of a predetermined period.

* * * * *